Oct. 15, 1957  M. BROWN  2,810,119
FLIGHT DIRECTION AND COURSE DEVIATION INDICATOR
Filed Jan. 25, 1954

INVENTOR.
MILTON BROWN
BY
Geo. J. Hyde
ATTORNEY

# United States Patent Office 2,810,119
Patented Oct. 15, 1957

2,810,119

FLIGHT DIRECTION AND COURSE DEVIATION INDICATOR

Milton Brown, New York, N. Y., assignor to Bendix Aviation Corporation, Teterboro, N. J., a corporation of Delaware Application January 25, 1954, Serial No. 405,711

4 Claims. (Cl. 340—27)

This invention relates to electrical signal systems, and more specifically to systems in which two separate but related signals are derived from a signal source. It is particularly designed for use in signal systems of the type employed in aircraft, in which deviations from a selected course are indicated with relation to the direction of radio signals from a ground source.

In such systems the deviation indicator will operate in the same manner regardless of whether the ground signal source is behind or ahead of the aircraft, being designed to show merely the angle of deviation from the course line. However, it is often important to know whether the signal source is behind or ahead of the craft, especially in blind flying; and this invention includes for this purpose an arrangement known as an ambiguity indicator.

A feature of the invention is the provision of a signal system including a rotary transformer arranged to produce from the same source two related signals, such as a deviation signal and an ambiguity signal. This is accomplished by employing a transformer in which one element, such as the rotor, comprises two windings at an angle to each other lying in the same inductive field, so that different signals are produced in the windings by the field. In the indicated embodiment these windings will be at right angles to each other.

In the application of the invention to aircraft course indicating systems, advantage is taken of the fact that when the aircraft passes beyond the ground signal source, the received signals are reversed in phase. A purpose of the invention is to provide a novel signal system in which an ambiguity indicator is operated by this phase reversal. A further object is to provide a simple and effective unitary arrangement which will develop both deviation and ambiguity signals from the same ground signal.

This is accomplished in general by deriving the deviation signal from one of the windings at right angles to each other, and the ambiguity signal from the other winding, so that the ambiguity signal will be at a maximum when the deviation signal is at zero, and vice versa. With this arrangement, with deviations of the aircraft from its course up to 90° in either direction, the ambiguity signal will retain the same phase; but when the craft deviates more than 90° from the selected course, and therefore is traveling away from instead of toward the signal source, the ambiguity signal will reverse in phase, so that the observer will interpret properly the deviation signals as the craft swings back toward the course line in the opposite direction. The same reversal of the ambiguity signal will occur when the craft passes beyond the ground signal source, enabling the pilot to know when he has overshot the field in blind flying, regardless of what the deviation indicator may show.

With this arrangement the ambiguity signal will provide one type of indication when the direction of the aircraft lies within the two quadrants on opposite sides of the course in one direction, and an opposite signal when it lies in either of the two quadrants in the opposite direction. An object of the invention, stated more broadly, is therefore to provide an auxiliary signal which will identify which of two pairs of adjacent quadrants, that is, which of two half cycles of revolution, provides the source of a course-setting signal.

A feature of the invention is the facility with which it can be embodied in apparatus of standard type adapted for use with standard course setting and direction indicating systems, especially those used for aircraft. In particular, a purpose of the invention is to provide a signal system adapted for use with aircraft directional systems, such as those which indicate the direction to a ground signal source, or those which compute from said direction a course to be followed, apparatus of this kind being well known and in general use, especially in connection with omnirange systems.

Rotary transformers, referred to generically herein as synchros, are usually employed for the purpose, and the system may include a transmitter synchro having a rotor set by the direction indicator or a course computer, in combination with a receiver synchro having a stator in parallel with the stator of the transmitter synchro and a rotor from which navigation signals can be derived. In one form, the receiver synchro rotor is set, either manually or automatically, at an angle corresponding to the selected course; and with this arrangement deviation signals can be derived from the receiver synchro rotor. The invention is particularly adapted for use with this system, the latter rotor being of the indicated type, with two windings at right angles to each other.

A further object of the invention is to provide an effective indicating system suitable for use with rotary transformers of the described type which will provide indications of deviation and ambiguity.

Another object is to provide a system of this type that will likewise provide an indication of direction.

These and other objects and advantages of the invention will appear more fully hereafter from a consideration of the detailed description which follows, in conjunction with the accompanying drawing, wherein two embodiments of the invention are illustrated. It is to be expressly understood, however, that the drawing is for the purposes of illustration and description, and is not to be construed as defining the limits of the invention.

Figure 1:
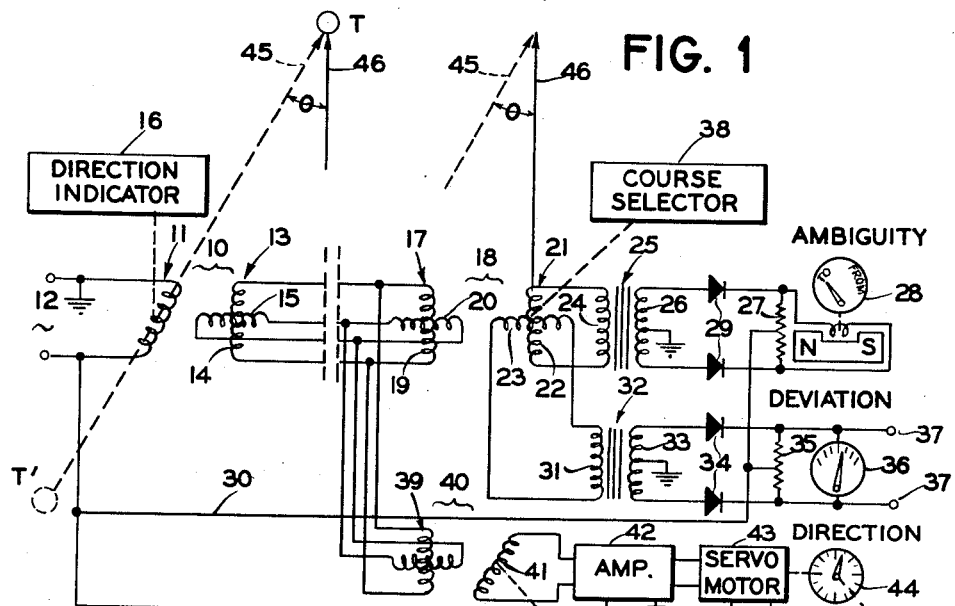
Fig. 1 is a diagram of an aircraft navigation system embodying the invention.

Referring to Fig. 1, a transmitter synchro 10, carried by an aircraft, includes a rotor 11 energized from alternating current source 12, and a stator 13 comprising a winding 14 and a winding 15 electrically at right angles to each other. Means is provided for aligning the rotor 11 with either the direction from which ground signals are received, or with a direction having an angular relation to the signal direction established by a course computer. Apparatus of this type, well known in the art, is designated generally as direction indicator 16.

The stator 13 of transmitter synchro 10 is connected "back to back" to the stator 17 of receiver synchro 18, normally located at a distance from synchro 10 and indicator 16. In this circuit the winding 14 of stator 13 is connected in parallel with winding 19 of stator 17, and winding 15 is connected in parallel with winding 20. Windings 19 and 20 are arranged at right angles to each other. The rotor 21 of synchro 18 includes an ambiguity winding 22 and a deviation winding 23 at right angles to each other.

Ambiguity signals from winding 22 are applied through a suitable circuit to an ambiguity indicator. In the embodiment illustrated the ambiguity winding 22 is connected across an impedance, such as primary 24 of transformer 25, whose secondary 26 is connected across a resistance 27 to an ambiguity indicator 28 of the voltmeter type through rectifiers 29. A central point of resistance 27 is connected through lead 30 to the ungrounded side of source 12, the other side of which is grounded; and a central point of transformer secondary 26 is likewise grounded, providing in effect a second connection to the source 12. The deviation windnig 23 of rotor 21 is similarly connected across the primary 31 of transformer 32, whose centrally grounded secondary 33 is connected at its end through rectifiers 34 across resistance 35 and deviation indicator 36 of the voltmeter type to output terminals 37. A central point of resistance 35 is likewise connected through lead 30 to the ungrounded side of source 12.

This system may be employed to operate a direction indicator. For this purpose the windings of transmitter stator 13 are similarly connected in parallel with the windings of the stator 39 of indicator synchro 40, the latter stator corresponding in construction with stator 17 of the receiver synchro 18 and having windings at right angles to each other. The single phase rotor 41 of synchro 40, which will be oriented with the field of stator 39 in well known manner, is connected through amplifier 42 and servomotor 43 to direction indicator 44. The rotor 41 is positioned by a shaft 48 driven through the indicator 44 by the servo motor 43 in a conventional manner so as to follow the position of rotor 11 of the transmitter synchro 10.

In operation, the rotor 11 of the transmitter synchro 10 is set by the direction indicator 16 in alignment with the direction of signals from the ground transmitter T, in the particular embodiment shown. Voltages will be induced in stator windings 14 and 15 which will be applied across stator windings 19 and 20 of the receiver synchro 18, creating a resultant magnetic field parallel to the alignment of transmitter rotor 11 in well known manner. The receiver synchro rotor 21 is set with the ambiguity winding 22 in alignment with a selected course, either manually or by the operation of a course selector 38 of known type.

In the simplified illustration it is assumed that it is desired to reach the ground transmitter T as a destination. The direction from the aircraft to the transmitter T is indicated by dotted lines 45, while the direction of the selected course to said transmitter is indicated by full line 46, the angle between them being indicated as θ. If the aircraft is on course, the receiving synchro rotor winding 23 will be in null position at right angles to the field of stator 17, and there will be no deviation signal on indicator 36; while the voltage induced in ambiguity winding 22 will be of proper phase when compared to the phase of the source 12 applied to secondary 26 and resistor 27, to locate the ambiguity indicator 28 in position to show that travel is "to" the destination.

However, as shown, the aircraft is headed to the right of the line 46 indicating the desired course, which is at an angle θ to the actual course 45, and a voltage corresponding in phase and amplitude to this deviation will be induced in deviation winding 23. This voltage will be compared in phase with that from source 12, rectified and applied to deviation indicator 36, which will show the direction and extent of such deviation. It will also be applied to terminals 37, which may be utilized to operate an automatic steering device or other arrangement which will bring the aircraft back on the desired course.

If the aircraft, in blind flying, should travel beyond terminal T, signals will be received from the opposite direction, as if coming from the phantom transmitter T', and their phase will of course be opposite to those previously received. This will not be evident from the deviation signals shown on indicator 36, which still will register merely the angular relation between the course of the aircraft and the direction of the ground signals; but it will reverse the polarity of the signals applied to ambiguity indicator 28, which will be shifted to show that the aircraft is traveling "from" the signal source. The rotor 41 of the indicator synchro 40 will maintain the same relative angular position as the rotor 11 of the transmitter synchro 10, so that the indicator 44 will at all times show the actual direction of the ground signal transmitting station in the illustrated embodiment, or the relationship of the desired course to that direction when a course computer is employed.

Figure 2:
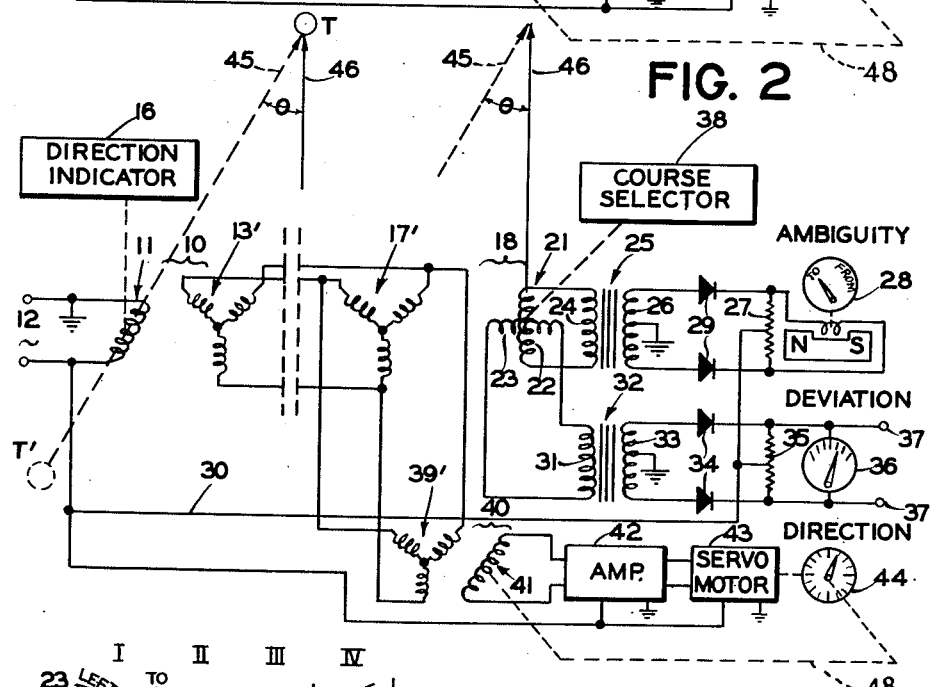
Fig. 2 is a diagram of a modified form.

While the form shown in Fig. 1 is advantageous in various ways, other types of synchro may be employed, one alternative form being illustrated in Fig. 2. This arrangement is identical with that shown in Fig. 1, except that it employs synchros having three phase Y-connected stators instead of the two phase stators with windings at right angles illustrated in Fig. 1. This arrangement is superior in practice where one or more direction indicators are to be operated; and the parts are designated by the same numerals except for primed numerals for the stators.

Figure 3:
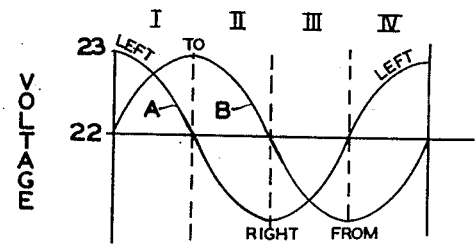
Fig. 3 is a graph illustrating the phase relations of the two signals.

The general principle of operation is illustrated in Fig. 3. Curve A indicates the voltages induced in deviation winding 23 as rotor 21 revolves through 360° relative to the orientation of the magnetic field induced by stator 17 while curve B indicates the voltage similarly induced in ambiguity winding 22. When the aircraft is traveling toward the signal source, the voltage induced in ambiguity winding 22 will always be positive (at the particular stage of operation selected for the illustration). The voltage induced in deviation winding 23 will be zero when the winding is at null position at 90° to the axis of the magnetic field and will be positive as the plane deviates to the left, or negative when it deviates to the right, up to 90° deviation in either direction.

When, however, the deviation goes beyond these points, or if the aircraft passes the signal source T, the phase of the voltage on winding 22 will be reversed, swinging the ambiguity indicator 28 to the "from" position, which it will retain while the deviation winding voltage varies from zero at the 270° null position in either direction. These deviations will of course register on the deviation indicator 36 merely as fluctuations from zero, and therefore will correspond to similar fluctuations in the first two quadrants I and II. However, the ambiguity indicator 28 will show the observer that the aircraft is traveling away from the signal source T.

While an embodiment of the invention has been shown and described, together with a modification thereof, it is to be expressly understood that the invention is not limited thereto. While the two sections of each synchro have been designated as rotor and stator, these relationships may be reversed for certain purposes in known manner. Moreover, while the invention is especially adapted for advantage in aircraft navigation, and thereby has been described in connection therewith, certain features may be used in other embodiments where a similar relationship between signals is desirable. Various other changes can therefore be made in the design and arrangement of the parts without departing from the spirit and scope of the invention, as the same will now be understood by those skilled in the art.

I claim:

1. A signal system, comprising means for generating a deviation signal including a synchro having a stator member and a selectively adjustable rotor member, one of said members arranged to generate a magnetic field having a selected orientation corresponding to a given condition and the other of said members located in said field said other member having a first winding and an indicator means connected to said winding and responsive to signals generated in said winding by deviation from a selected angular relation to said field, said signals having corresponding values in opposite half cycles of relative rotation of said members, said indicator means being indicative of the deviation from said selected relation; and means for generating an ambiguity signal indicating the half cycle in which said deviation signals are generated, including said other member having a second winding at right angles to the first winding, and another indicator means connected to the second winding and responsive to said ambiguity signal and the angular relation of the second winding to the field, said other indicator means being indicative of the half cycle in which said deviation signals are generated.

2. In an aircraft a signal system, comprising a transmitter synchro including a rotor-energized from an A. C. source and a polyphase stator, said rotor being adjustably positioned in accordance with the direction of flight of the aircraft; a receiver synchro including a polyphase stator connected to and energized by the transmitter synchro stator to create a magnetic field corresponding to the position of the transmitter synchro rotor, and a second rotor adjustably positioned in accordance with a selected course of flight of the aircraft, said second rotor including two windings at right angles to each other; a first signal take-off circuit connected to and energized by one of said windings, said first signal take-off circuit including means for indicating a flight course condition of said aircraft; and a second signal take-off circuit connected to and energized by the other winding, said second signal take-off circuit including means for indicating a different flight course condition of said aircraft, the signals in said circuits being in phase quadrature to effect the indicaton of the flight course conditions by the respective indicator means.

3. In an aircraft a signal system, comprising a transmitter synchro including a rotor energized from an A. C. source and a polyphase stator, said rotor being adjustably positioned in accordance with the direction of flight of the aircraft; a receiver synchro including a polyphase stator connected to and energized by the transmitter synchro stator to create a magnetic field corresponding to the position of the transmitter synchro rotor, and a second rotor adjustably positioned in accordance with a selected course of flight of the aircraft, said second rotor including two windings at right angles to each other; a first signal take-off circuit connected to and energized by one of said windings; and a second signal take-off circuit connected to and energized by the other winding, the signals in said circuits being in phase quadrature, each of said signal take-off circuits comprising a phase-sensitive network connected to said source, one of said circuits including an indicator actuated by the network output to effect the indication of a flight course condition of said aircraft, and the other of said circuits including an indicator actuated by the network output to effect a different flight course condition of said aircraft.

4. In an aircraft a directional signal system for use during flight, comprising a transmitter synchro including a rotor energized from an A. C. source, arranged for orientation in accordance with a direction of actual flight of the aircraft, and a polyphase stator; a receiver synchro including a polyphase stator connected to and energized by the transmitter synchro stator to create a magnetic field having an orientation corresponding to the orientation of the transmitter synchro rotor, and a rotor arranged for orientation in accordance with a selected course of flight of the aircraft and a fixed directional factor, said rotor including a winding positioned in a null position at right angles to the receiver synchro field when the latter field is in alignment with the transmitter synchro rotor as upon the actual direction of flight of the aircraft corresponding to the selected course of flight, a deviation signal take-off circuit connected to said rotor winding and including means responsive to signals generated in the winding upon a deviation in the direction of flight of the aircraft from the selected course in either direction, said signals having corresponding values in opposite half cycles of revolution; and means for indicating such deviation in the actual direction of flight of the aircraft in response to the half cycle in which said deviation signals are generated, a second receiver synchro rotor winding at right angles to the first winding, and a phase responsive circuit connected to the second winding including a second indicator means to designate the direction of flight of the aircraft relative to said fixed directional factor.

References Cited in the file of this patent

UNITED STATES PATENTS 1,554,915    Hewlett _____ Sept. 22, 1925